US009846715B2

(12) United States Patent
Kato et al.

(10) Patent No.: US 9,846,715 B2
(45) Date of Patent: Dec. 19, 2017

(54) ADDRESS/LATITUDE AND LONGITUDE CONVERTING DEVICE AND GEOGRAPHICAL INFORMATION SYSTEM USING THE SAME

(71) Applicant: WingArc1st Inc., Tokyo (JP)

(72) Inventors: Taiyo Kato, Tokyo (JP); Ko Shimazawa, Tokyo (JP); Kosuke Yoshihara, Tokyo (JP)

(73) Assignee: WINGARC1ST INC., Tokyo (JP)

( * ) Notice: Subject to any disclaimer, the term of this patent is extended or adjusted under 35 U.S.C. 154(b) by 0 days.

(21) Appl. No.: 15/029,939

(22) PCT Filed: Aug. 17, 2015

(86) PCT No.: PCT/JP2015/073000
§ 371 (c)(1),
(2) Date: Apr. 15, 2016

(87) PCT Pub. No.: WO2016/072124
PCT Pub. Date: May 12, 2016

(65) Prior Publication Data
US 2016/0328430 A1    Nov. 10, 2016

(30) Foreign Application Priority Data
Nov. 5, 2014 (JP) ................................. 2014-225250

(51) Int. Cl.
*G01C 21/26* (2006.01)
*G01C 21/32* (2006.01)
*G06F 17/30* (2006.01)

(52) U.S. Cl.
CPC ....... *G06F 17/30327* (2013.01); *G01C 21/26* (2013.01); *G01C 21/32* (2013.01); *G06F 17/30241* (2013.01)

(58) Field of Classification Search
CPC ......... G06F 17/30241; G06F 17/30327; G01C 21/26; G01C 21/32
See application file for complete search history.

(56) References Cited

U.S. PATENT DOCUMENTS 6,909,965 B1 * 6/2005 Beesley ................. G01C 21/32
340/990
2006/0271281 A1 * 11/2006 Ahn ..................... G09B 29/106
701/532

(Continued)

FOREIGN PATENT DOCUMENTS

JP    07-200693 A    8/1995
JP    08-050594 A    2/1996

(Continued)

*Primary Examiner* — Jorge A Casanova
(74) *Attorney, Agent, or Firm* — Polsinelli PC (57) ABSTRACT

By converting address information 200 input to a geocoding unit 10 into a tree structure formed hierarchically in an administrative district, generating address tree information obtained by associating latitude and longitude information with at least a node of the lowest layer in each branch of the tree structure and storing the address tree information thus generated in a high-speed accessible memory 14 to proceed a retrieval while tracing the address tree information in order from a parent node to a child node to narrow down a retrieval range, it is possible to efficiently search latitude and longitude information corresponding to given address information therefrom and to perform a retrieval at a higher speed as compared with the related art in which access is given to a conversion table stored in a disk.

2 Claims, 3 Drawing Sheets

(56) References Cited

U.S. PATENT DOCUMENTS

2008/0183730 A1* 7/2008 Enga ................. G06F 17/30241
2012/0179699 A1* 7/2012 Ward ................ G06F 17/30589
                       707/754

FOREIGN PATENT DOCUMENTS

| | | |
|---|---|---|
| JP | 2000-011000 A | 1/2000 |
| JP | 2003-223453 A | 8/2003 |
| JP | 2012-194676 A | 10/2012 |

* cited by examiner

ADDRESS/LATITUDE AND LONGITUDE CONVERTING DEVICE AND GEOGRAPHICAL INFORMATION SYSTEM USING THE SAME

CROSS REFERENCE TO RELATED APPLICATIONS

This application is a National Phase filing under 35 U.S.C. §371 of PCT/JP2015/07300 filed on Aug. 17, 2015; and this application claims priority to Application No. 2014-225250 filed in Japan on Nov. 5, 2014, under 35 U.S.C. §119. The entire contents of each application are hereby incorporated by reference.

TECHNICAL FIELD

The present invention relates to an address/latitude and longitude converting device and a geographical information system using the same and more particularly is suitably used for an address/latitude and longitude converting device for converting geographical information about an address into coordinate information about a latitude and longitude and a geographical information system for performing a predetermined processing by using latitude and longitude information converted by the address/latitude and longitude converting device.

BACKGROUND ART

Conventionally, there is known the technology for converting geographical information such as an address or a place name into coordinate information about a latitude and longitude (for example, see Patent Documents 1 and 2). The technology is referred to as geocoding and is widely used practically in an application using a map. For example, there is provided a system obtained by combining the geocoding and the geographical visualizing technology referred to as GIS (Geographic Information System). According to the system of this type, for example, values linked to addresses in a database, totalization results thereof or the like can be displayed to be easily understood visually in a corresponding position on a map based on a latitude and longitude converted from the address.

Referring to the information processing device described in the Patent Document 1, address book information and latitude and longitude information acquired based on the address information are stored as a conversion table corresponding to each other, and a latitude and longitude of the position is obtained from a prefecture, a city, a town and a street of the address information by utilizing the conversion table. Map image information is retrieved based on the latitude and longitude information and is synthesized with the address book information, and an address book or a current position is displayed.

The information processing device described in the Patent Document 1 stores, in the conversion table, latitude and longitude information about a spot corresponding to an address according to a hierarchical structure of "prefecture•city•town•street". Even if an address to be input is not complete like "1-chome, Yoshidacho, Totsuka-ku, Yokohama-shi, Kanagawa-ken" but only a high order hierarchy such as "Yokohama-shi, Kanagawa-ken" or "Totuka-ku, Yokohama-shi, Kanagawa-ken", it is possible to obtain coordinates of spots corresponding to respective addresses.

Referring to the coordinate imparting system described in the Patent Document 2, moreover, a latitude and longitude database causing an address and position coordinates to correspond to each other is prepared and the position coordinates corresponding to the input address are retrieved from the database. In the retrieval, by narrowing position coordinates every hierarchy based on an administrative district, it is possible to perform the retrieval while compensating for the imperfection of the input address information every hierarchy. Consequently, it is possible to enhance retrieval accuracy.

Patent Document 1: Japanese Laid-Open Patent Publication No. 1996-50594

Patent Document 2: Japanese Laid-Open Patent Publication No. 2003-223453

DISCLOSURE OF THE INVENTION

In recent years, API (Application Programming Interface) for performing the geocoding described above is provided and address information can be converted into latitude and longitude information by utilizing the API. Referring to the conventional geocoding using the API, however, there is a problem in that a conversion speed is very low, such as several cases to several tens cases per second and a long time is taken for a processing. For this reason, if the latitude and longitude information is converted from the address information by the geocoding when a request is given from an application for performing some processing by utilizing the latitude and longitude information, a response time taken to display a result after giving the request is increased.

For example, in the case in which data having addresses in an area designated by a user is to be visualized and displayed visually by visualization software by taking, as a target, a database having an enormous number of data stored from a business system or the like, a very long time is required for visualizing and displaying data in the designated area. When a large number of data are included in the designated area, a time of several tens minutes to several hours is sometimes required for converting the address information into the latitude and longitude information by the geocoding, resulting in very poor operability.

In order to avoid the inferiority in a response, conventionally, all of the address information stored in the database are previously converted into the latitude and longitude information by the geocoding to generate an intermediate table, and the intermediate table is referred to, thereby performing a processing corresponding to a request given from an application if any.

In this case, however, it is necessary to activate the geocoding, thereby maintaining the intermediate table when new data is registered in the database or existing data is updated. Conventionally, the maintenance is performed by a batch processing. For this reason, there is a problem in that data registered newly in the database or data having an address changed cannot be utilized by referring to a position from an application until the maintenance of the intermediate table is completed.

The present invention has been made in order to solve the problems and has an object to enable conversion from address information into latitude and longitude information at a high speed in real time depending on a request given from an application utilizing the latitude and longitude information without generating an intermediate table requiring maintenance by a batch processing.

In order to attain the object, an address/latitude and longitude converting device according to the present invention serves to convert input address information into a tree structure formed hierarchically in an administrative district, to generate address tree information obtained by associating latitude and longitude information with at least nodes of the lowest layer in each branch of the tree structure, and to store the generated address tree information in a high-speed accessible memory.

According to the present invention having the structure described above, information to be used for converting the address information into the latitude and longitude information is not prepared in a form of a conventional conversion table obtained by causing each address and each latitude and longitude to perform one-to-one correspondence to each other but a form of the tree structure and is stored in the high-speed accessible memory. When actually converting the address information into the latitude and longitude information, therefore, it is possible to efficiently search the latitude and longitude information corresponding to the given address information therefrom by proceeding a retrieval while tracing the address tree information of the tree structure in order from a parent node to a child node to narrow down a retrieval range. In addition, in the present invention, the address tree information is stored in the high-speed accessible memory. As compared with the related art in which access is given to a conversion table stored in a disk, therefore, it is possible to perform a retrieval at a high speed.

From the foregoing, even if the conversion from the address information into the latitude and longitude information is performed when a request from an application utilizing the latitude and longitude information is given, the conversion can be completed in a very short time. Therefore, it is possible to implement remarkably high response performance. Consequently, it is not necessary to previously generate an intermediate table in order to avoid inferiority in a response as in the related art. According to the present invention, thus, it is possible to perform the conversion from the address information into the latitude and longitude information at a high speed in real time depending on the request given from the application utilizing the latitude and longitude information without generating the intermediate table requiring maintenance by a batch processing.

BEST MODE FOR CARRYING OUT THE INVENTION

Figure 1:
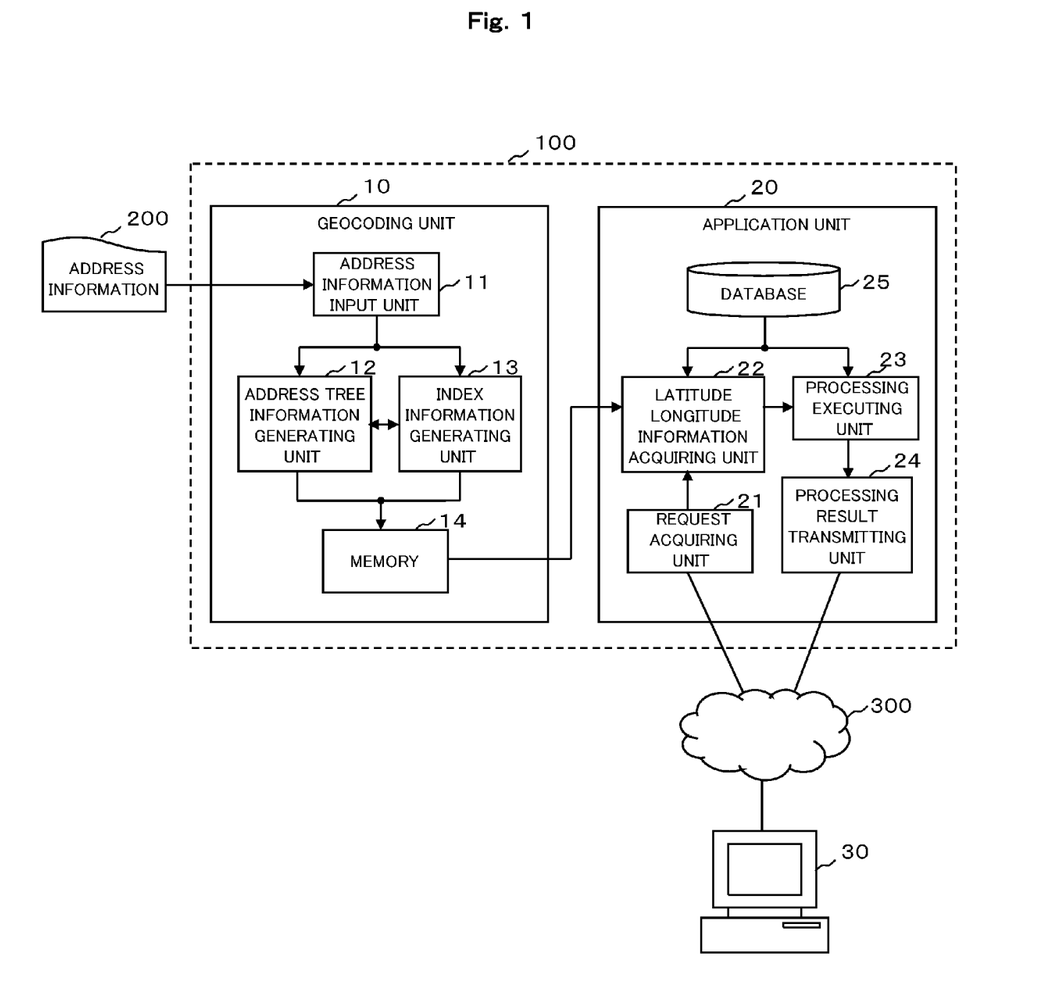
FIG. 1 is a diagram showing an example of a structure of a geographical information system executing an address/latitude and longitude converting device according to the present embodiment.

An embodiment of the present invention will be described below with reference to the drawings. FIG. 1 is a diagram showing an example of a structure of a geographical information system executing an address/latitude and longitude converting device according to the present embodiment. As shown in FIG. 1, a geographical information system 100 according to the present embodiment includes a geocoding unit 10 and an application unit 20.

The geocoding unit 10 serves to convert address information into latitude and longitude information and is configured from a server device, for example. The geocoding unit 10 includes an address information input unit 11, an address tree information generating unit 12, an index information generating unit 13 and a memory 14. Each of functional blocks of the address information input unit 11, the address tree information generating unit 12 and the index information generating unit 13 is configured from software installed in a server device, for example.

In other words, each of the functional blocks 11 to 13 actually includes a CPU, an RAM, an ROM and the like in a computer and is implemented by operating a program stored in a recording medium such as the RAM, the ROM, a hard disk, a semiconductor memory or the like. The server device having the geocoding unit 10 is equivalent to the address/latitude and longitude converting device according to the present invention. A part or whole of the respective functional blocks 11 to 13 can also be configured from hardware or a DSP (Digital Signal Processor).

The application unit 20 serves to perform a predetermined application processing by using the latitude and longitude information converted from the address information through the geocoding unit 10 and is configured from a server device, for example. The application unit 20 includes a request acquiring unit 21, a latitude and longitude information acquiring unit 22, a processing executing unit 23, a processing result transmitting unit 24 and a database 25.

Each of functional blocks of the request acquiring unit 21, the latitude and longitude information acquiring unit 22, the processing executing unit 23 and the processing result transmitting unit 24 is configured from software installed in the server device, for example. The software is visualization software through the GIS, for example, and values linked to addresses and stored in the database 25, totalization results thereof or the like can be displayed to be easily understood visually in a corresponding position on a map based on the latitude and longitude converted from the address.

The respective functional blocks 21 to 24 actually include a CPU, an RAM, an ROM and the like in a computer and are implemented by operating a program stored in a recording medium such as the RAM, the ROM, a hard disk, a semiconductor memory or the like. Apart or whole of the respective functional blocks 21 to 24 can also be configured from hardware or a DSP.

The geocoding unit 10 and the application unit 20 (both of the server devices) are connected to each other by an LAN, for example, and can mutually transmit/receive data. Moreover, the application unit 20 is configured to be connectable to a user terminal 30 through a communication network 300 such as internet. The user terminal 30 transmits a request to the application unit 20 depending on a user operation, thereby causing the application unit 20 to execute a desirable processing, and can obtain a result of the processing and display the result on a screen.

Although the description has been given to the structure in which the separate server devices include the geocoding unit 10 and the application unit 20 respectively with reference to FIG. 1, the present invention is not restricted to this configuration. For example, it is also possible to employ a structure in which a single server device includes the geocoding unit 10 and the application unit 20. Moreover, the functions of the address information input unit 11, the address tree information generating unit 12 and the index information generating unit 13 in the geocoding unit 10 and those of the latitude and longitude information acquiring unit 22 and the processing executing unit 23 in the application unit 20 may be implemented by software installed in the user terminal 30.

The address information input unit 11 of the geocoding unit 10 inputs address information 200 from an outside. The address information 200 is the same as address information stored in the database 25 of the application unit 20. For example, the address information 200 can be constituted by a CSV file output from the database 25. Alternatively, the address information input unit 11 may be configured to directly input the address information from the database 25 of the application unit 20. In this case, a configuration for inputting the address information 200 is not restricted to a configuration of the CSV file.

The database 25 stores one or more data having at least an address as an item. Items other than the address are arbitrary. Data to be stored in the database 25 may be any of client business card data, company sales data, various statistical data and the like and their types and contents do not matter. In the case in which the data is output from the database 25 to constitute the address information 200, it is sufficient that there is at least information about an item of an address and information about the other items are not required. Although the example of FIG. 1 shows the structure in which the application unit 20 includes the database 25, the database 25 may be provided on the outside of the application unit 20 (the server device).

The address tree information generating unit 12 converts the address information 200 input by the address information input unit 11 into a tree structure formed hierarchically in an administrative district and generates address tree information obtained by associating latitude and longitude information with at least nodes of the lowest layer in each branch of the tree structure. Then, the address tree information thus generated is stored in the high-speed accessible memory 14. The high-speed accessible memory 14 is referred to as a main storage device or a primary storage device and can read/write data at a higher speed (approximately 100000 times) as compared with a disk type storage device referred to as an auxiliary storage device or a secondary storage device.

Figure 2:
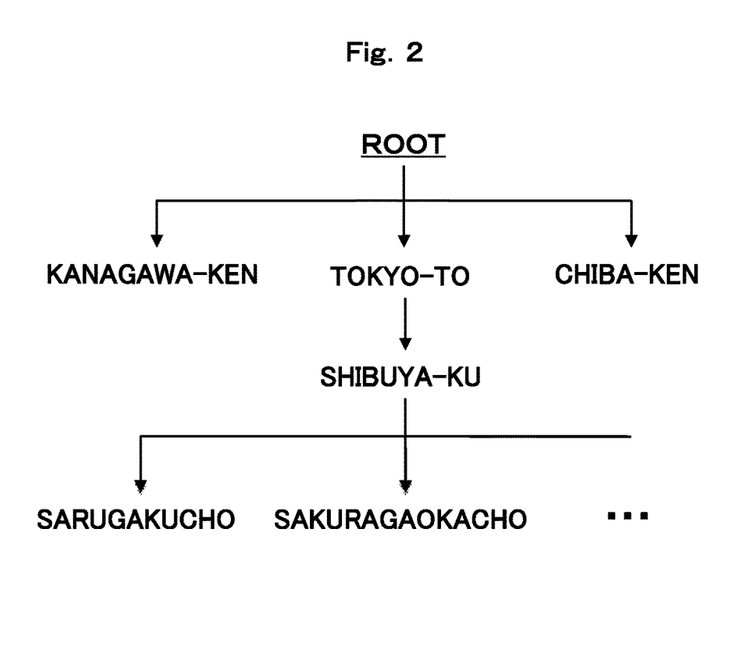
FIG. 2 is a diagram typically showing a part of address tree information to be generated by an address tree information generating unit according to the present embodiment.

FIG. 2 is a diagram typically showing a part of the address tree information to be generated by the address tree information generating unit 12. As shown in FIG. 2, with a configuration in which a first hierarchy (a top layer) is set to be a root node, a second hierarchy is set to be a prefecture, a third hierarchy is set to be a ward or a municipality, a fourth hierarchy is set to be the municipality or the ward, and a fifth hierarchy or less is set to be a residence indication (a block mark and a house number) or a lot number, the address information 200 is converted into a tree structure formed hierarchically by an administrative district. Then, the latitude and longitude information corresponding to positions of the block mark and the house number are associated with nodes of the lowest layer in each branch of the tree structure (a node related to the residence indication or the lot number) to constitute the address tree information.

By associating the latitude and longitude information with the nodes of the lowest layer, it is possible to associate the latitude and longitude with a perfect address such as "20-1, Sakuragaokacho, Shibuya-ku, Tokyo-to". In contrast, the latitude and longitude information may be further associated with a node of a high order hierarchy. Consequently, a latitude and a longitude can be associated with an imperfect address such as "Shibuya-ku, Tokyo-to" or "Sakuragaoka-cho, Shibuya-ku, Tokyo-to". Even if the perfect address is not stored in the database 25, thus, the imperfect address information can be converted into latitude and longitude information corresponding to that position.

The index information generating unit 13 generates index information constituted by each name allocated to each node of each hierarchy in the address tree information generated by the address tree information generating unit 12 (a name of a prefecture or a municipality, a block mark, a home number, a lot number or the like) and each pointer from the each name to each node of each hierarchy in the address tree information. Then, the index information thus generated is stored in the memory 14.

The address information 200 includes an imperfect address starting with the second hierarchy of the address tree information such as " . . . Shibuya-ku" as well as a perfect address starting with the first hierarchy of the address tree information such as " . . . Shibuya-ku, Tokyo-to". For either of the addresses, the address tree information generated by the address tree information generating unit 12 needs to be retrievable. Moreover, it is necessary to handle words of approximately 200000 names. For this reason, it is preferable that a word can be retrieved at a high speed in a memory-saving manner.

Figure 3:
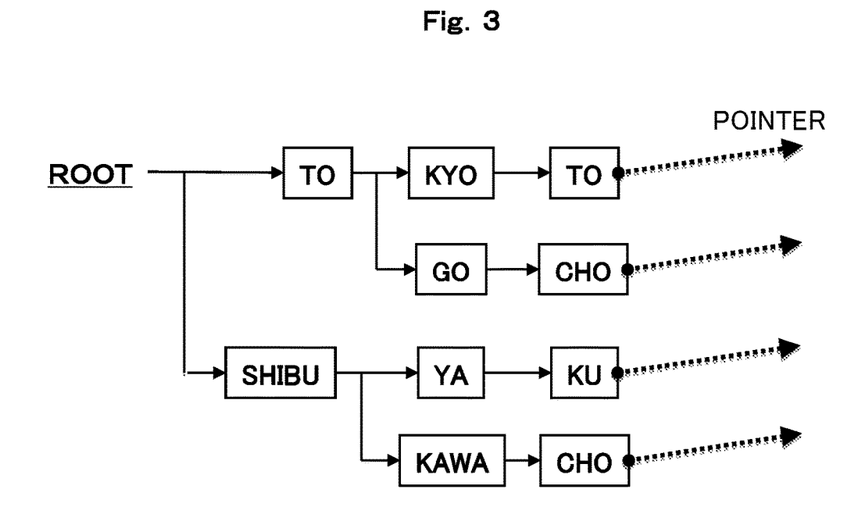
FIG. 3 is a diagram typically showing a part of index information to be generated by an index information generating unit according to the present embodiment.

In the present embodiment, therefore, the index information generating unit 13 generates index information having a tree structure shown in FIG. 3. FIG. 3 is a diagram typically showing a part of the index information to be generated by the index information generating unit 13. As shown in FIG. 3, the index information is constituted by representing a plurality of names to be allocated to respective nodes of respective hierarchies in the address tree information as a tree structure formed hierarchically character by character and associating pointers from the nodes of the lowest layer in each branch of the tree structure to corresponding nodes in the address tree information with the nodes.

For example, both a name of "Tokyo-to" and a name of "Togocho" are words starting with "To". In this case, there is generated index information having a tree structure in which a first hierarchy is set to be a root node, a second hierarchy is set to be "To", a third hierarchy is set to be "kyo" and "go", and a fourth hierarchy is set to be "to" and "cho". A character of "To" which is common to two words is shared by the first hierarchy. The pointers to corresponding nodes in the address tree information are associated with a node of "to" to be the lowest layer related to "Tokyo-to" and a node of "cho" to be the lowest layer related to "Togocho" and they are thus stored.

Similarly, both a name of "Shibuya-ku" and a name of "Shibukawacho" are words starting with "Shibu". In this case, there is generated index information having a tree structure in which a first hierarchy is set to be a root node, a second hierarchy is set to be "Shibu", a third hierarchy is set to be "ya" and "kawa", and a fourth hierarchy is set to be "ku" and "cho". A character of "Shibu" which is common to two words is shared by the first hierarchy. The pointers to corresponding nodes in the address tree information are associated with a node of "ku" to be the lowest layer related to "Shibuya-ku" and a node of "cho" to be the lowest layer related to Shibukawacho" and they are thus stored.

Figure 4:
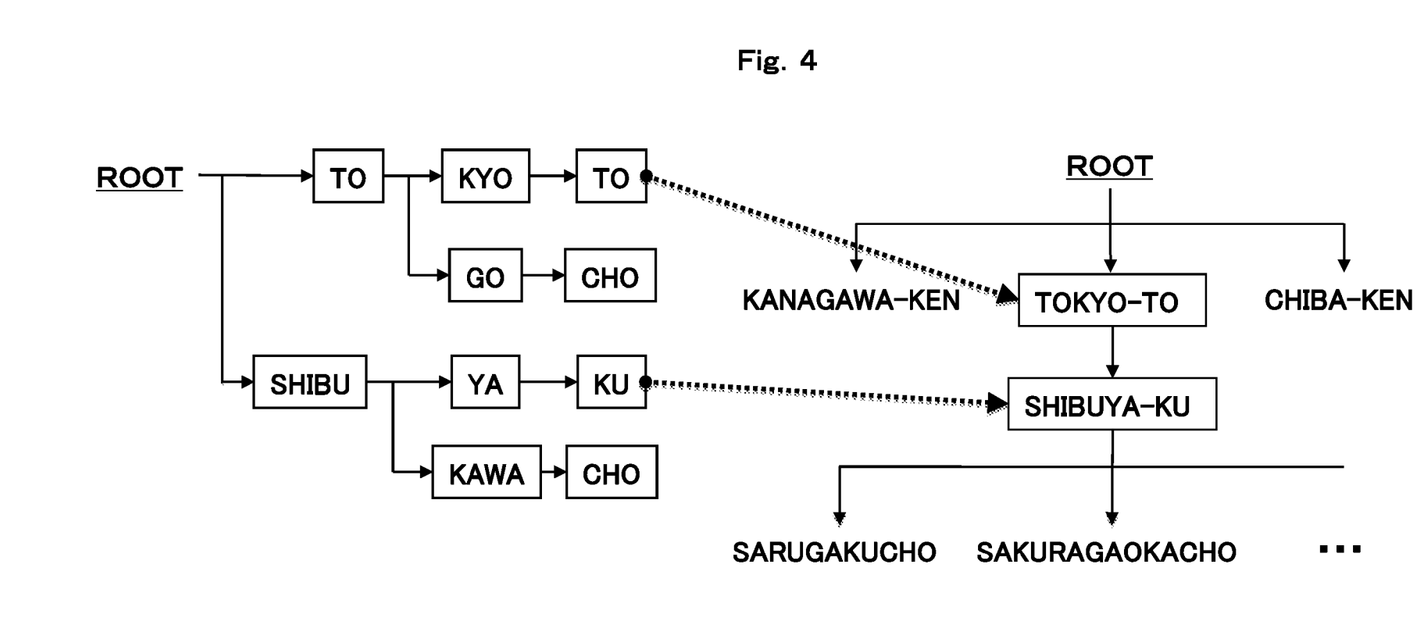
FIG. 4 is a diagram typically showing a state in which the index information and the address tree information are associated with each other through pointers according to the present embodiment.

FIG. 4 is a diagram typically showing a state in which the index information generated by the index information generating unit 13 and the address tree information generated by the address tree information generating unit 12 are associated with each other by the pointers. As shown in FIG. 4, the name of "Tokyo-to" in the index information is associated with the node of "Tokyo-to" in the first hierarchy of the address tree information by the pointer. Moreover, the name of "Shibuya-ku" in the index information is associated with the node of "Shibuya-ku" in the second hierarchy of the address tree information by the pointer.

The processings of the address information input unit 11, the address tree information generating unit 12 and the index information generating unit 13 are executed when the application unit 20 is activated, for example. An example of a time that the application unit 20 is activated includes a time that login from the user terminal 30 to the application unit 20 is performed. For instance, when the login from the user terminal 30 to the application unit 20 is performed, the database 25 outputs the address information and the address information input unit 11 inputs the address information as the address information 200. Based on the address information 200, then, the address tree information generating unit 12 generates the address tree information and stores the address tree information in the memory 14, and furthermore, the index information generating unit 13 generates the index information and stores the index information in the memory 14.

Every time the application unit 20 is activated, thus, the address tree information and the index information are generated and stored in the memory 14 based on the address information output from the database 25. Consequently, the address tree information and the index information to be stored in the memory 14 can be the newest information adapted to the newest address information stored in the database 25. In other words, it is possible to generate the address tree information and the index information corresponding to the address information in the database 25 without performing maintenance through a batch processing.

The request acquiring unit 21 of the application unit 20 acquires a request for executing a desirable application processing from the user terminal 30. Herein, the acquirement request defines execution of some geographical information processing by using the data stored in the database 25 and visualization and visual display of a result thereof.

Examples of the geographical information processing include a processing for displaying pin marks in positions on a map corresponding to addresses based on address information contained in client business card data stored in the database 25, for example. Moreover, it is also possible to perform a processing for totalizing and graphically displaying the number of business cards having addresses in respective areas (the number of clients) every area designated on the map based on the address information contained in the client business card data stored in the database 25. The processing taken as the example is only illustrative and the present invention is not restricted thereto.

In order to perform the above geographical information processing by using map data having no address information, it is necessary to specify the position on the map corresponding to the address information based on coordinate information. However, the latitude and longitude information to be the coordinate information are not stored in the database 25 but only the address information is stored as information to be used for specifying a position. In the present embodiment, when the request acquiring unit 21 receives a processing request from the user terminal 30, the address information of the database 25 is converted into the latitude and longitude information in real time.

In other words, when the request acquiring unit 21 receives the processing request from the user terminal 30, that is, a request for performing the application processing (the geographical information processing) utilizing the address information over the data stored in the database 25 is generated, the latitude and longitude information acquiring unit 22 acquires the latitude and longitude information corresponding to the address information contained in the data in the database 25 which is set to be a processing target depending on the content of the processing request by referring to the address tree information stored in the memory 14 of the geocoding unit 10.

More specifically, the latitude and longitude information acquiring unit 22 first searches corresponding nodes in the address tree information in accordance with the pointers indicated as the index information by referring to the index information based on the address information contained in the data in the database 25 which is set to be the processing target. For example, if the address information of the data which is set to be the processing target is " . . . Shibuya-ku, Tokyo-to", the node of "Tokyo-to" in the second hierarchy of the address tree information is searched in accordance with the pointer indicated as the index information about "Tokyo-to" to be a first word of the address information. If the address information of the data to be the processing target is " . . . Shibuya-ku", moreover, the node of "Shibuya-ku" in the third hierarchy of the address tree information is searched in accordance with the pointer indicated as the index information about "Shibuya-ku" to be the first word of the address information.

Subsequently, the latitude and longitude information acquiring unit 22 sequentially performs a search from the searched node based on the index information toward a low order layer on the basis of the address information contained in the data in the database 25 which is set to be the processing target and acquires latitude and longitude information from the node of the lowest layer with which the latitude and longitude information is associated. For example, if the node of the "Tokyo-to" in the second hierarchy is searched based on the index information, the latitude and longitude information acquiring unit 22 traces, in order, "Shibuya-ku" of the third hierarchy, "Sakuragaokacho" of the fourth hierarchy, "20" of the fifth hierarchy and "1" of the sixth hierarchy in the address tree information based on the address information of "20-1, Sakuragaokacho, Shibuya-ku, Tokyo-to" which is set to be the processing target and thus acquires latitude and longitude information associated with a node of "1" of the sixth hierarchy.

In the present embodiment, thus, there is employed a construction in which both the address tree information and the index information are constituted by the tree structure and the nodes having the same name are associated with each other by the pointers. Consequently, it is possible to efficiently search a relevant node in the address tree information in accordance with the pointer indicated as the index information by referring to the index information having the tree structure based on the address information. By further searching the address tree information of the tree structure from the searched relevant node toward the low order layer, moreover, it is possible to efficiently acquire the latitude and longitude information associated with the node of the lowest layer. In addition, these processings can be executed under high-speed access to the memory 14. Even if there is no conventional intermediate table, therefore, the address information stored in the database 25 can be converted into the latitude and longitude information in a short time.

The processing executing unit 23 performs a predetermined application processing by using the latitude and longitude information acquired by the latitude and longitude information acquiring unit 22. The application processing to be performed herein indicates a geographical information processing corresponding to the processing request received by the request acquiring unit 21. The processing result transmitting unit 24 transmits a result of the processing executed by the processing executing unit 23 to the user terminal 30 and displays the result on a screen of the user terminal 30. Then, the address tree information stored in the memory 14 is used as data for reference to convert the address information into the latitude and longitude information in execution of the application processing in the application unit 20.

As described above in detail, in the present embodiment, the address information 200 input to the geocoding unit 10 is converted into the tree structure formed hierarchically in the administrative district and the address tree information constituted by associating the latitude and longitude information with at least the nodes of the lowest layer in each branch of the tree structure is generated, and the address tree information thus generated is stored in the high-speed accessible memory 14.

According to the present embodiment having such a structure, the information to be used for converting the address information into the latitude and longitude information is not generated in a form of a conventional conversion table obtained by causing each address and each latitude and longitude to perform one-to-one correspondence to each other but a form of the tree structure. For this reason, when actually converting the address information into the latitude and longitude information, it is possible to efficiently search the latitude and longitude information corresponding to given address information therefrom by proceeding a retrieval while tracing the address tree information of the tree structure in order from a parent node to a child node to narrow down a retrieval range. In addition, in the present embodiment, the address tree information is stored in the high-speed accessible memory 14. As compared with the related art in which access is given to a conversion table stored in a disk, therefore, the retrieval can be performed at a high speed.

In the present embodiment, moreover, the index information constituted by the name to be allocated to each node of each hierarchy in the address tree information and each pointer from the each name to each node of each hierarchy in the address tree information is generated based on the address information 200 input to the geocoding unit 10, and the index information thus generated is stored in the memory 14. When actually converting the address information into the latitude and longitude information, consequently, it is possible to efficiently find a first node in the execution of the search in the address tree information in accordance with the pointer indicated as the index information by first referring to the index information based on the address information in the database 25 which is set to be the processing target.

From the foregoing, even if the latitude and longitude information is converted from the address information in the database 25 in real time when a request is given from the application unit 20 utilizing the latitude and longitude information, the conversion can be completed in a very short time. Therefore, it is possible to implement remarkably high response performance. Consequently, it is not necessary to previously generate an intermediate table in order to avoid inferiority in a response as in the related art. According to the present embodiment, thus, it is possible to perform the conversion from the address information into the latitude and longitude information at a high speed in real time depending on the request given from the application unit 20 utilizing the latitude and longitude information without generating the intermediate table requiring the maintenance through the batch processing.

Although the description has been given to the example in which the address tree information and the index information are generated and stored in the memory 14 in the embodiment, only the address tree information may be generated and stored in the memory 14 and the conversion from the address information into the longitude and latitude information may be performed by using only the address tree information. Also in this case, the conversion processing can be performed at a high speed. However, it is preferable to use the index information in that the conversion processing can be performed at a higher speed.

Although the description has been given to the example in which the address tree information and the index information are generated from the address information in the database 25 and are stored in the memory 14 in the activation of the application unit 20 (for example, login) in the embodiment, moreover, the present invention is not restricted thereto. For example, the address tree information and the index information may be generated every time the database 25 is edited and updated contents thereof are stored. Alternatively, the address tree information and the index information may be periodically generated at a certain interval while the database 25 is edited.

In addition, the embodiment is only illustrative for concreteness in the execution of the present invention and the technical scope of the present invention should not be thereby construed to be restrictive. In other words, the present invention can be carried out in various configurations without departing from the gist or main features thereof.

EXPLANATION OF DESIGNATION

10 geocoding unit (address/latitude and longitude converting device)
11 address information input unit
12 address tree information generating unit
13 index information generating unit
14 memory
20 application unit
22 latitude and longitude information acquiring unit
23 processing executing unit

The invention claimed is:

1. A geographical information system including a geocoding unit for converting address information into latitude and longitude information and an application unit for performing a predetermined application processing by using the latitude and longitude information converted by the geocoding unit, the geocoding unit comprising:

an address information input unit for inputting the address information stored in a database that the application unit has;

an address tree information generating unit for converting the address information input by the address information input unit into a tree structure formed hierarchically in an administrative district, generating address tree information obtained by associating latitude and longitude information with at least a node of the lowest layer in each branch of the tree structure, and storing the address tree information thus generated in a high-speed accessible memory; and an index information generating unit for generating index information constituted by each name to be allocated to each node of each hierarchy in the address tree information and each pointer of the name to each node of the hierarchy in the address tree information and storing the index information thus generated in the memory, and the application unit comprising:

a latitude and longitude information acquiring unit for the latitude and longitude information corresponding to address information contained in data which is set to be the processing target from a node with which the latitude and longitude information is associated when a request for performing the predetermined application processing using the information of the database and the latitude and longitude information is generated; and a processing executing unit for performing the predetermined application processing by using the latitude and longitude information acquired by the latitude and longitude information acquiring unit;

wherein processing of the address information input unit, the address tree information generating unit and the index information generating unit are executed when the application unit is activated, every time the application unit is activated.

2. The geographical information system according to claim 1, wherein the index information is obtained by representing a plurality of names to be allocated to the respective nodes of the respective hierarchies as a tree structure formed hierarchically character by character and associating each pointer to a node of the lowest layer in each branch of the tree structure.

\* \* \* \* \*